United States Patent
Dong et al.

(10) Patent No.: US 12,277,755 B1
(45) Date of Patent: Apr. 15, 2025

(54) METHOD, APPARATUS, DEVICE, AND MEDIUM FOR IMAGE RECOGNITION VIA WIRELESS FEDERATED LEARNING

(71) Applicant: SHENZHEN UNIVERSITY, Shenzhen (CN)

(72) Inventors: Yanjie Dong, Shenzhen (CN); Luya Wang, Shenzhen (CN); Jia Wang, Shenzhen (CN); Jianqiang Li, Shenzhen (CN); Haijun Zhang, Shenzhen (CN); Fei Yu, Shenzhen (CN); Song Guo, Shenzhen (CN); Zhongming Liang, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 0 days.

(21) Appl. No.: 18/750,709

(22) Filed: Jun. 21, 2024

(51) Int. Cl.
G06V 10/778 (2022.01)
G06V 10/77 (2022.01)
G06V 10/776 (2022.01)
G06V 10/94 (2022.01)
G06V 10/96 (2022.01)
G06V 20/62 (2022.01)

(52) U.S. Cl.
CPC ........ *G06V 10/778* (2022.01); *G06V 10/7715* (2022.01); *G06V 10/776* (2022.01); *G06V 10/94* (2022.01); *G06V 10/96* (2022.01); *G06V 20/62* (2022.01)

(58) Field of Classification Search
CPC ............. G06V 10/778; G06V 10/7715; G06V 10/776; G06V 10/94; G06V 10/96; G06V 20/62
See application file for complete search history.

(56) References Cited

U.S. PATENT DOCUMENTS

| | | | |
|---|---|---|---|
| 2021/0342749 A1* | 11/2021 | Wang | G06N 20/20 |
| 2022/0270382 A1* | 8/2022 | Ma | G06V 10/80 |
| 2023/0281462 A1* | 9/2023 | Wu | G06N 3/098 |
| | | | 706/25 |
| 2023/0327728 A1* | 10/2023 | Jeon | H04B 17/318 |
| | | | 370/329 |
| 2024/0005211 A1* | 1/2024 | Wu | G06V 10/82 |
| 2024/0037370 A1* | 2/2024 | Chan | G06Q 40/06 |

* cited by examiner

*Primary Examiner* — Amara Abdi
(74) *Attorney, Agent, or Firm* — Westbridge IP LLC

(57) ABSTRACT

Disclosed are a method, an apparatus, a device, and a medium for image recognition via wireless federated learning. The method for image recognition via wireless federated learning includes: obtaining an image to be recognized and an initial image recognition model; adjusting parameters for the initial image recognition model via a preset accelerated mobile federated learning algorithm according to a target momentum factor to obtain a target image recognition model; and recognizing the image to be recognized through the target image recognition model to obtain text information corresponding to the image to be recognized.

7 Claims, 4 Drawing Sheets

--- obtaining an image to be recognized and an initial image recognition model — S10 adjusting a parameter for the initial image recognition model via a preset accelerated mobile federated learning algorithm according to a target momentum factor to obtain a target image recognition model — S20 recognizing the image to be recognized through the target image recognition model to obtain text information corresponding to the image to be recognized. — S30

METHOD, APPARATUS, DEVICE, AND MEDIUM FOR IMAGE RECOGNITION VIA WIRELESS FEDERATED LEARNING

TECHNICAL FIELD

The present application relates to the technical field of wireless communication technology, especially focus on a method, an apparatus, a device, and a medium for image recognition via wireless federated learning.

BACKGROUND

With the continuous development of Internet technology, people are more interested in expressing personal thoughts through pictures. For example, image emoticons are used to express the emotions of the current moment in chat, and road signs at intersections are used to indicate traffic requirements, such as speed limits, no parking, prohibited entry, other coded images in specific areas, etc. However, for different users, there may be situations where expressions or icons cannot be understood, resulting in misinterpretation of the original meaning. The relevant technology currently used to identify images includes image-based binarization, denoising, feature extraction, and feature recognition operations. However, the above-mentioned related technologies perform image recognition in an operational manner, making it impossible to adapt to the impact of noise and fading in the wireless channel on image recognition during the recognition process, resulting in lower accuracy of image recognition.

The above content is only used to assist in understanding the technical solution of the present application, and does not represent an admission that the above content is prior art.

SUMMARY

The primary purpose of the present application is to provide a method, an apparatus, a device, and a medium for image recognition via wireless federated learning, which aims to solve the technical problem that existing technology cannot adapt to the impact of noise and fading in wireless channels on image recognition, resulting in low accuracy of image recognition.

In order to achieve the above purpose, the present application provides a method for image recognition via wireless federated learning, including:
  obtaining an image to be recognized and an initial image recognition model;
  adjusting a parameter for the initial image recognition model via a preset accelerated mobile federated learning algorithm according to a target momentum factor to obtain a target image recognition model; and
  recognizing the image to be recognized through the target image recognition model to obtain text information corresponding to the image to be recognized.

In some embodiments, adjusting the parameter for the initial image recognition model via the preset accelerated mobile federated learning algorithm according to the target momentum factor to obtain the target image recognition model includes:
  obtaining a running dataset of clients, wherein the number of the clients is N, and N is greater than or equal to 1;
  performing feature extraction on the running dataset through a preset distributed principal component decomposition algorithm to obtain target running data;
  determining target gradient information based on a current model parameter, a link distance, and the target running data; and
  adjusting the parameter for the initial image recognition model via the preset accelerated mobile federated learning algorithm according to the target momentum factor and the target gradient information to obtain the target image recognition model.

In some embodiments, adjusting the parameter for the initial image recognition model via the preset accelerated mobile federated learning algorithm according to the target momentum factor and the target gradient information to obtain the target image recognition model includes:
  performing gradient alignment on the initial image recognition model according to current gradient information;
  aggregating the initial image recognition model after gradient alignment; and
  adjusting the parameter for the initial image recognition model after aggregating via the preset accelerated mobile federated learning algorithm according to the target momentum factor and an iterative auxiliary model parameter to obtain the target image recognition model.

In some embodiments, the determining the target gradient information based on the current model parameter, the link distance, and the target running data includes:
  calculating a channel attenuation cancellation factor based on the link distance and a channel coefficient vector;
  obtaining a client output power according to the target running data;
  setting a channel alignment coefficient according to the channel coefficient vector, the channel attenuation cancellation factor, and the client output power; and
  determining the target gradient information according to the channel alignment coefficient.

In some embodiments, determining the target gradient information according to the channel alignment coefficient includes:
  obtaining a preset power control parameter;
  calculating current gradient information according to the preset power control parameter and the channel alignment coefficient; and
  normalizing the current gradient information according to a local dataset to obtain the target gradient information.

In some embodiments, before the recognizing the image to be recognized through the target image recognition model to obtain the text information corresponding to the image to be recognized, the method further includes:
  obtaining a sample test dataset;
  testing the target image recognition model according to the sample test dataset to obtain a current test result;
  determining current convergence performance of the target image recognition model according to the current test result;
  in response to that the current convergence performance is higher than or equal to a preset convergence performance threshold, recognizing the image to be recognized through the target image recognition model to obtain the text information corresponding to the image to be recognized; or
  in response to that the current convergence performance is lower than the preset convergence performance threshold, adjusting the parameter for the initial image recognition model.

In some embodiments, recognizing the image to be recognized through the target image recognition model to obtain the text information corresponding to the image to be recognized includes:

performing feature extraction on the image to be recognized through a preset distributed principal component decomposition algorithm to obtain a feature of the image to be recognized; and recognizing the feature of the image to be recognized through the target image recognition model to obtain the text information corresponding to the image to be recognized.

In addition, in order to achieve the above purpose, the present application further provides an apparatus for image recognition via wireless federated learning, including:

an obtaining module, configured to obtain an image to be recognized and an initial image recognition model;

a parameter-adjusting module, configured to adjust a parameter for the initial image recognition model via a preset accelerated mobile federated learning algorithm according to a target momentum factor to obtain a target image recognition model; and a recognizing module, configured to recognize the image to be recognized through the target image recognition model to obtain text information corresponding to the image to be recognized.

In addition, in order to achieve the above purpose, the present application further provides a device for image recognition via wireless federated learning, including a memory, a processor, and a program for image recognition via wireless federated learning stored on the memory and executable on the processor. When the processor executes the program for image recognition via wireless federated learning, the above-mentioned method for image recognition via wireless federated learning is implemented.

In addition, in order to achieve the above purpose, the present application further provides a non-transitory computer-readable storage medium. A program for image recognition via wireless federated learning is stored on the storage medium. When the processor executes the program for image recognition via wireless federated learning, the above-mentioned method for image recognition via wireless federated learning is implemented.

The method for image recognition via wireless federated learning proposed by the present application obtains the image to be recognized and the initial image recognition model; adjusts the parameters of the initial image recognition model according to the target momentum factor through the preset accelerated mobile federated learning algorithm to obtain the target image recognition model; and recognizes the image to be recognized through the target image recognition model to obtain text information corresponding to the image to be recognized. In the above manner, the initial image recognition model parameters are adjusted to the target image recognition model according to the target momentum factor through the preset accelerated mobile federated learning algorithm, and then the target image recognition model is used to identify the image to be recognized, so that it can adapt to the impact of noise and fading in the wireless channel on image recognition, thereby effectively improving the accuracy of image recognition.

The realization of the purpose, functional characteristics and advantages of the present application will be further described with reference to the attached drawings in combination with embodiments.

DETAILED DESCRIPTION OF THE EMBODIMENTS

It should be understood that the specific embodiments described here are only used to explain the present application and are not intended to limit the present application.

Figure 1:
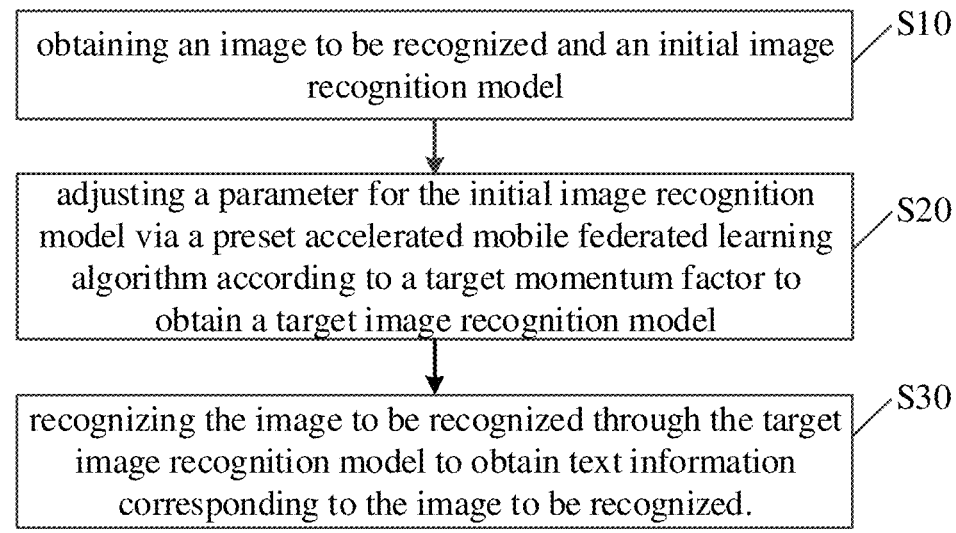
FIG. 1 is a schematic flow chart of a method for image recognition via wireless federated learning according to some embodiments of the present application.

As shown in FIG. 1, FIG. 1 is a schematic flow chart of a method for image recognition via wireless federated learning according to some embodiments of the present application.

In some embodiments, the method for image recognition via wireless federated learning includes:

step S10, obtaining an image to be recognized and an initial image recognition model.

It should be noted that the execution subject of these embodiments is a device for image recognition via wireless federated learning, and there can also be other devices that can implement the same or similar functions, such as a wireless federated learning system, etc. These embodiments do not limit this. In these embodiments, the wireless federated learning system is taken as an example for explanation.

It should be understood that the image to be recognized is captured by the client through a camera. The image to be recognized can be a road sign image, a coded image, or other meaningful images. The initial image recognition model refers to a conventional image recognition model. However, this initial image recognition model is susceptible to the impact of noise and fading in the line channel in the process from the acquisition of the image to be recognized to the actual image recognition.

Step S20, adjusting parameters for the initial image recognition model via a preset accelerated mobile federated learning algorithm according to a target momentum factor to obtain a target image recognition model.

It can be understood that the preset accelerated mobile federated learning algorithm refers to a learning algorithm that uses wireless edge clients to collect data to train the model in a distributed manner. The target momentum factor refers to the constant parameter required to adjust the initial image recognition model. The preset accelerated mobile federated learning algorithm can be the PCA-WFL algorithm or the Nesterov momentum-accelerated PCA-AWFL algorithm. After the parameter adjustment is completed, the target image recognition model is obtained.

Step S30, recognizing the image to be recognized through the target image recognition model to obtain text information corresponding to the image to be recognized.

It should be understood that the text information refers to the description information corresponding to the image to be recognized. After the image to be recognized is obtained, the text information corresponding to the image to be recognized is identified through the target image recognition model. For example, if the image to be recognized is a red circle on a white background, the text information indicates that all vehicles and pedestrians are prohibited from passing. The road sign corresponding to the image to be recognized is usually set at the entrance of a prohibited road. If the image to be recognized is a red cross on a white background, the text information indicates No Parking.

Furthermore, before step S30, the method further includes: obtaining a sample test dataset; testing the target image recognition model according to the sample test dataset to obtain a current test result; determining the current convergence performance of the target image recognition model according to the current test result; in response to that the current convergence performance is higher than or equal to a preset convergence performance threshold, recognizing the image to be recognized through the target image recognition model to obtain the text information corresponding to the image to be recognized; and in response to that the current convergence performance is lower than the preset convergence performance threshold, adjusting parameters for the initial image recognition model.

It can be understood that the sample test dataset refers to a dataset for testing the convergence performance of the target image recognition model. Specifically, after obtaining the sample test dataset, the target image recognition model is tested based on the sample test dataset, and then it is determined whether the current convergence performance in the current test result is higher than or equal to the preset convergence performance threshold. If yes, it indicates that the target image recognition model is qualified. At this time, the target image can be identified through the target image recognition model. If no, it indicates that the target image recognition model is unqualified. At this time, the text information recognized by the target image recognition model is inaccurate. Therefore, it is necessary to continue to adjust according to the above parameter adjustment method until the convergence performance of the target image recognition model is higher than or equal to the preset convergence performance threshold.

In addition, the step S30 includes: performing feature extraction on the image to be recognized through a preset distributed principal component decomposition algorithm to obtain a feature of the image to be recognized; and recognizing the feature of the image to be recognized through the target image recognition model to obtain the text information corresponding to the image to be recognized.

It should be understood that the preset distributed principal component decomposition algorithm refers to a decomposition algorithm that extracts data feature. Since the number of clients in these embodiments is N, the image to be recognized is distributed among N clients. In order to improve the efficiency and accuracy of image recognition, the image features of the image to be recognized are extracted through the preset distributed principal component decomposition algorithm features, which are the image features to be recognized, and then the image features to be recognized are input into the target image recognition model for recognition, thereby outputting text information corresponding to the image to be recognized.

Figure 2:
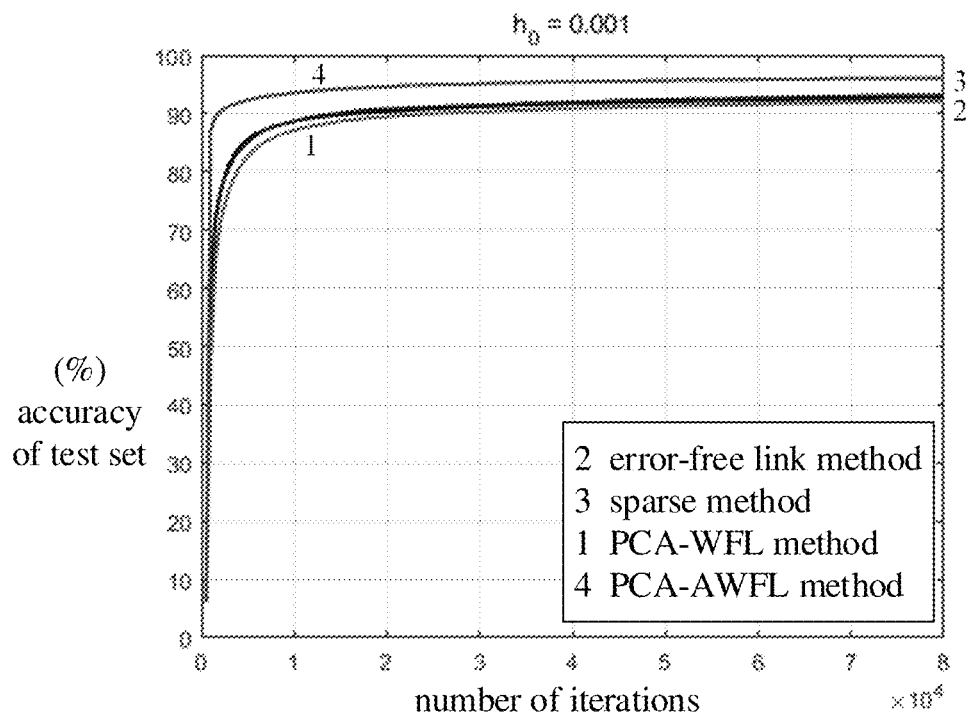
FIG. 2 is a schematic view of convergence performance of a training model of the method for image recognition via wireless federated learning according to some embodiments of the present application.
Figure 3:
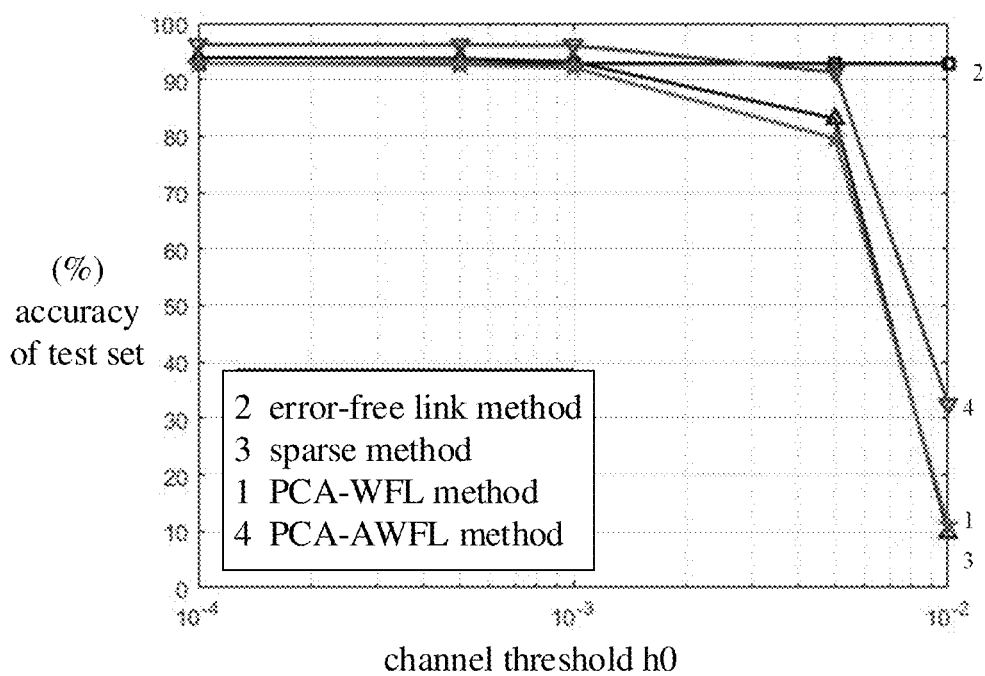
FIG. 3 is a schematic view of a channel threshold and model effect of the method for image recognition via wireless federated learning according to some embodiments of the present application.

It can be understood that, as shown in FIG. 2, FIG. 2 is a schematic view of convergence performance of a training model, specifically including the convergence performances of the error-free link training method, sparse training method, PCA-WFL algorithm training method, and Nesterov momentum accelerated PCA-AWFL algorithm training method. Through comparison, it can be seen that model training using the PCA-WFL algorithm and the Nesterov momentum-accelerated PCA-AWFL algorithm can achieve convergence effects faster than other training methods, with higher convergence performance and fewer iterations. As shown in FIG. 3, which is a schematic view of a channel threshold and model effect. Through comparison, it can be seen that model training using the PCA-WFL algorithm and the Nesterov momentum-accelerated PCA-AWFL algorithm has better image recognition model effects and better channel threshold tolerance than other training methods.

In these embodiments, the image to be recognized and the initial image recognition model are obtained; the parameters of the initial image recognition model are adjusted according to the target momentum factor through the preset accelerated mobile federated learning algorithm to obtain the target image recognition model; and the image to be recognized is recognized through the target image recognition model to obtain the text information corresponding to the image to be recognized. In the above manner, the initial image recognition model parameters are adjusted to the target image recognition model through the preset accelerated mobile federated learning algorithm according to the target momentum factor, and then the target image recognition model is used to identify the image to be recognized, so as to be able to adapt to the impact of noise and fading in the wireless channel on image recognition, thereby effectively improving the accuracy of image recognition.

Figure 4:
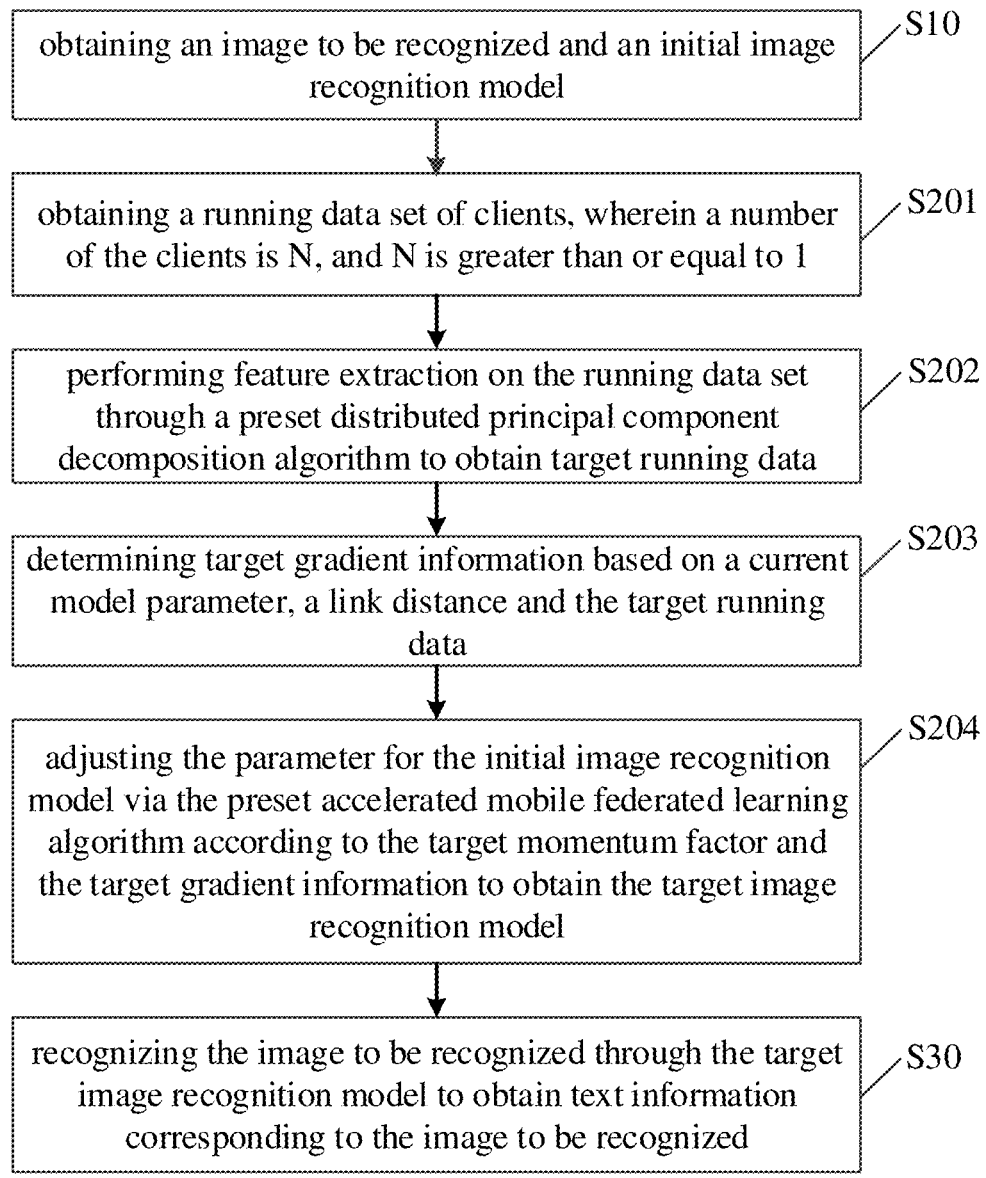
FIG. 4 is a schematic flow chart of the method for image recognition via wireless federated learning according to some other embodiments of the present application.

In some embodiments, as shown in FIG. 4, FIG. 4 is a schematic flow chart of the method for image recognition via wireless federated learning according to some other embodiments of the present application. The step S20 includes:

step S201, obtaining a running dataset of clients, the number of the clients is N, and N ≥1.

It should be understood that the wireless federated learning system refers to a learning system that uses digital modulation to provide reliable channels. The wireless federated learning system includes a server and N clients. The running dataset of clients refers to a collection of each running data of the client. The running data includes but is not limited to operating time, and transmission power in each period during operation.

Figure 5:
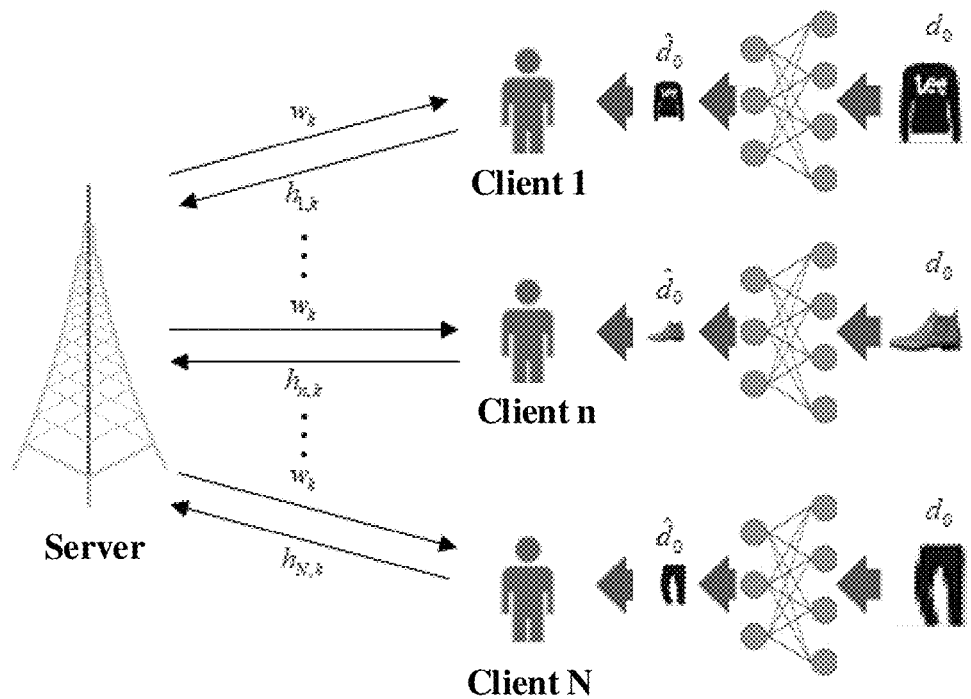
FIG. 5 is a schematic view of a wireless federated learning system of the method for image recognition via wireless federated learning according to some embodiments of the present application.

It can be understood that, with reference to FIG. 5, FIG. 5 is a schematic view of a wireless federated learning system; specifically, there are N clients, namely client 1, . . . , client n, . . . , and client N, there is only one server, and the client and the server interact through wireless communication. Specifically, the client 1, . . . , the client n, . . . , and the client N send the channel coefficient vector $h_{1,k}$, $h_{n,k}$ and $h_{N,k}$ to the server respectively, then the server broadcasts the current model parameter $w_k$ to the client 1, . . . , the client n, . . . , and the client N respectively, and the dimension of the current model parameter $w_k$ is d. That is to say, the server transmits the target image recognition model to the client, and the client transmits the target gradient information of the loss function about the target image recognition model to the server.

Step S202, performing feature extraction on the running dataset through a preset distributed principal component decomposition algorithm to obtain target running data.

It can be understood that after obtaining the running dataset, the target running data is extracted from the features in the running dataset of N clients through a preset distributed principal component decomposition algorithm. The target running data includes the maximum transmission power of each client.

Step S203, determining target gradient information based on a current model parameter, a link distance, and the target running data.

It should be understood that the current model parameters refer to each hierarchical parameter of the initial image recognition model, and the link distance refers to the distance of the link between the client and the server. After obtaining the target running data, the target gradient information is determined according to the current model parameters, link distance, and target running data.

The determining the target gradient information based on the current model parameter, the link distance and the target running data includes: calculating a channel attenuation cancellation factor based on the link distance and a channel coefficient vector; obtaining a client output power according to the target running data; setting a channel alignment coefficient according to the channel coefficient vector, the channel attenuation cancellation factor and the client output power; and determining the target gradient information according to the channel alignment coefficient.

It can be understood that after the link distance is obtained, the channel attenuation cancellation factor is calculated based on the link distance and the channel coefficient vector. The specific calculation formula is:

$$c_{n,k} := \frac{1}{\mathbb{E}[\mathbb{1}_{n,k}[i]]} = \exp(\delta_{n,k}^{\alpha} h_0^2),$$

where $h_{n,k}$ represents the channel coefficient vector of each client; $C_{n,k}$ represents the channel attenuation cancellation factor; $\delta_{n,k}$ represents the link distance; and $h_0$ represents the channel threshold.

It should be understood that the client output power refers to the maximum output power of each client. After obtaining the client output power and the channel attenuation cancellation factor, the channel alignment coefficient is set according to the channel coefficient vector, the channel attenuation cancellation factor, and the client output power via the following formula:

$$\frac{1}{\rho_{n,k}^2} = \frac{c_{n,k}^2}{p_0} \sum_{i=1}^{d_1} \frac{|\mathbb{1}_{n,k}[i] y_{n,k}[i]|^2}{|h_{n,k}[i]|^2 \|y_{n,k}\|^2}$$

wherein $$\frac{1}{\rho_{n,k}^2}$$

represents the reciprocal of the channel alignment coefficient, $\mathbb{1}_{n,k}$ represents the channel scheduling vector of the n-th client in the k-th iteration; $\mathbb{1}_{n,k}[i]$ represents the i-th value of $\mathbb{1}_{n,k}$; $y_{n,k} := \nabla f_n(w_k)$ represents the gradient vector of the n-th client at the k-th iteration; $y_{n,k}[i]$ represents the i-th value of the gradient vector; and $p_0$ represents the client output power.

Furthermore, the determining the target gradient information according to the channel alignment coefficient includes: obtaining a preset power control parameter; calculating current gradient information according to the preset power control parameter and the channel alignment coefficient; and normalizing the current gradient information according to a local dataset to obtain the target gradient information.

It should be understood that the preset power control parameters refer to parameters that control the transmission power of the client, and then the current gradient information is calculated through the preset power control parameters and channel alignment coefficients via the following formula:

$$y_{n,k}[i] = \begin{cases} \rho_{n,k} c_{n,k} \dfrac{h_{n,k}^*[i]}{|h_{n,k}[i]|^2}, & |h_{n,k}[i]| \geq h_0 \\ 0, & |h_{n,k}[i]| \leq h_0 \end{cases},$$

where $y_{n,k}[i]$ represents the current gradient information, and $h_{n,k}$ represents the channel coefficient vector of each client.

It can be understood that the local dataset refers to a collection of data stored locally on the client. After obtaining the current gradient information, each client normalizes the current gradient information based on the local dataset via the following formula:

$$\nabla_{n,k} = \rho_{n,k} c_{n,k} \mathbb{1}_{n,k} \odot \frac{y_{n,k}}{\|y_{n,k}\|} + z_{n,k},$$

where $\nabla_{n,k}$ represents the target gradient information; $y_{n,k}[i]$ represents the current gradient information, and $Z_{n,k} \sim CN(0, \sigma^2 I)$ represents additive Gaussian white noise.

Step S204, adjusting parameters for the initial image recognition model via the preset accelerated mobile federated learning algorithm according to the target momentum factor and the target gradient information to obtain the target image recognition model.

It can be understood that after obtaining the target gradient information, the parameters of the initial image recognition model are adjusted according to the target momentum factor and target gradient information through the preset accelerated mobile federated learning algorithm, via the following formula:

$$u_{k+1} = \beta u_k + \frac{1}{N} \sum_{n=1}^{N} \hat{\nabla}_{n,k}$$

$$v_k = \beta u_{k+1} + \frac{1}{N} \sum_{n=1}^{N} \hat{\nabla}_{n,k}$$

$$w_{k+1} = w_k - \eta v_k,$$

where $u_k$ and $v_k$ represent the auxiliary model parameters of the k-th iteration, $\beta$ represents the target momentum factor, and $w_{k+1}$ represents the current model parameter.

Furthermore, the step S204 includes: performing gradient alignment on the initial image recognition model according to current gradient information; aggregating the initial image recognition model after gradient alignment; and adjusting parameters for the initial image recognition model after aggregating via the preset accelerated mobile federated learning algorithm according to the target momentum factor and an iterative auxiliary model parameter to obtain the target image recognition model.

It should be understood that after obtaining the initial image recognition model after gradient alignment, the initial image recognition model after gradient alignment is aggregated via the following formula:

$$\frac{1}{N}\sum_{n=1}^{N}\hat{v}_{n,k} = \frac{1}{N}\sum_{n=1}^{N}C_{n,k}1_{n,k} \odot y_{n,k} + z_k$$

wherein $$Z_{n,k} = \frac{1}{N}\sum_{n=1}^{N}\frac{Z_{n,k}\|y_{n,k}\|}{\rho_{n,k}}$$

represents the accumulated noise of the wireless channel and $$\frac{1}{N}\sum_{n=1}^{N}\hat{v}_{n,k}$$

represents the aggregated image recognition model parameters.

In these embodiments, the client running dataset is obtained, the number of clients is N, and N is greater than or equal to 1; feature extraction is performed on the running dataset through a preset distributed principal component decomposition algorithm to obtain the target running data; according to the current model parameter, the link distance and the target running data, the target gradient information is determined; through the preset accelerated mobile federated learning algorithm, the parameters of the initial image recognition model are adjusted according to the target momentum factor and the target gradient information to obtain the target image recognition model. Through the above method, after obtaining the client running dataset, the target running data is extracted from the features in the running dataset through the preset distributed principal component decomposition algorithm, and then the target gradient information is determined based on the current model parameters, link distance, and target running data. The target image recognition model is adjusted according to the target momentum factor and target gradient information parameters through the preset accelerated mobile federated learning algorithm, thus effectively improving the accuracy of the target image recognition model.

In addition, embodiments of the present application also provide a storage medium on which a program for image recognition via wireless federated learning is stored. When the program for image recognition via wireless federated learning is executed by the processor, steps of the method for image recognition via wireless federated learning are implemented.

Since this storage medium adopts all the technical solutions of the above embodiments, it has at least all the beneficial effects brought by the technical solutions of the above embodiments, which will not be described again here.

Figure 6:
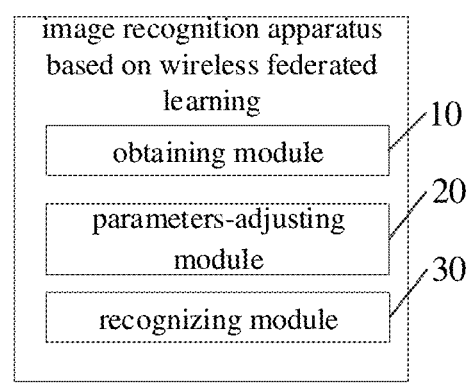
FIG. 6 is a schematic view of functional modules of an apparatus for image recognition via wireless federated learning according to some other embodiments of the present application.

In addition, as shown in FIG. 6, the present application also proposes an apparatus for image recognition via wireless federated learning. The apparatus for image recognition via wireless federated learning includes an obtaining module 10, a parameter-adjusting module 20, and a recognizing module 30.

The obtaining module 10 is configured to obtain an image to be recognized and an initial image recognition model.

The parameter-adjusting module 20 is configured to adjust parameters for the initial image recognition model via a preset accelerated mobile federated learning algorithm according to a target momentum factor to obtain a target image recognition model.

The recognizing module 30 is configured to recognize the image through the target image recognition model to obtain text information corresponding to the image to be recognized.

In these embodiments, the image to be recognized and the initial image recognition model are obtained; the parameters of the initial image recognition model are adjusted according to the target momentum factor through the preset accelerated mobile federated learning algorithm to obtain the target image recognition model; and the image to be recognized is recognized through the target image recognition model to obtain the text information corresponding to the image to be recognized. In the above manner, the initial image recognition model parameters are adjusted to the target image recognition model through the preset accelerated mobile federated learning algorithm according to the target momentum factor, and then the target image recognition model is used to identify the image to be recognized, so as to be able to adapt to the impact of noise and fading in the wireless channel on image recognition, thereby effectively improving the accuracy of image recognition.

It should be noted that the workflow described above is only illustrative and does not limit the scope of the present application. In practical applications, those skilled in the art can select some or all of them to implement the purpose of this embodiment according to actual needs, which is not limited here.

In addition, for technical details that are not described in detail in this embodiment, the method for image recognition via wireless federated learning provided by any embodiment of the present application can be referred to, and will not be described again here.

For other embodiments of the device for image recognition via wireless federated learning according to the present application or implementation methods, reference can be made to the above method embodiments, and will not be repeated here.

It should be noted that in this article, the terms "include", "comprise" or any other variations thereof are intended to encompass non-exclusive inclusions, so that a process, method, article or system literally including a series of elements includes not only those elements, but also other elements not expressly listed or inherent to such a process, method, article, or system. Without further limitation, an element qualified by the phrase "including a . . . " does not preclude the existence of additional identical elements in the process, method, article, or system that includes the element.

The above-mentioned serial numbers of the embodiments of the present application are only for description, and do not represent the advantages or disadvantages of the embodiments.

From the description of the above embodiments, those skilled in the art can clearly understand that the methods of the above embodiments can be implemented not only by means of a software plus a necessary general hardware platform, but also by means of a hardware. However, in many cases, the former is better. Based on this understanding, the technical solutions of the present application in essence or the parts that make contributions to the prior art can be embodied in the form of software products. The computer software products are stored in a storage medium (such as a read-only memory/random access memory, a magnetic disk or an optical disk, etc.), and include several instructions to make a terminal device (such as a mobile phone, a computer, an integrated platform workstation, or a network device, etc.) execute the methods described in the various embodiments of the present application.

The above are only some of the embodiments of the present application, and are not intended to limit the patent scope of the present application. Any equivalent structure or equivalent process transformation made using the contents of the description and drawings of the present application, directly or indirectly applied in other related technical fields, is all equally included in the scope of the present application.

What is claimed is:

1. A method for image recognition via wireless federated learning, comprising:
   obtaining an image to be recognized and an initial image recognition model;
   adjusting a parameter for the initial image recognition model via a preset accelerated mobile federated learning algorithm according to a target momentum factor to obtain a target image recognition model; and
   recognizing the image to be recognized through the target image recognition model to obtain text information corresponding to the image to be recognized;
   wherein the adjusting the parameter for the initial image recognition model via the preset accelerated mobile federated learning algorithm according to the target momentum factor to obtain the target image recognition model comprises:
   obtaining a running dataset of clients, wherein the number of the clients is N, and N is greater than or equal to 1;
   performing feature extraction on the running dataset through a preset distributed principal component decomposition algorithm to obtain target running data;
   determining target gradient information based on a current model parameter, a link distance, and the target running data;
   performing gradient alignment on the initial image recognition model according to current gradient information;
   aggregating the initial image recognition model after gradient alignment; and
   adjusting the parameter for the initial image recognition model after aggregating via the preset accelerated mobile federated learning algorithm according to the target momentum factor and an iterative auxiliary model parameter to obtain the target image recognition model.

2. The method for image recognition via wireless federated learning of claim 1, wherein the determining the target gradient information based on the current model parameter, the link distance, and the target running data comprises:
   calculating a channel attenuation cancellation factor based on the link distance, and a channel coefficient vector;
   obtaining a client output power according to the target running data;
   setting a channel alignment coefficient according to the channel coefficient vector, the channel attenuation cancellation factor, and the client output power; and
   determining the target gradient information according to the channel alignment coefficient.

3. The method for image recognition via wireless federated learning of claim 2, wherein the determining the target gradient information according to the channel alignment coefficient comprises:
   obtaining a preset power control parameter;
   calculating current gradient information according to the preset power control parameter and the channel alignment coefficient; and
   normalizing the current gradient information according to a local dataset to obtain the target gradient information.

4. The method for image recognition via wireless federated learning of claim 1,
   wherein before recognizing the image to be recognized through the target image recognition model to obtain the text information corresponding to the image to be recognized, the method further comprises:
   obtaining a sample test dataset;
   testing the target image recognition model according to the sample test dataset to obtain a current test result;
   determining current convergence performance of the target image recognition model according to the current test result;
   in response to that the current convergence performance is higher than or equal to a preset convergence performance threshold, recognizing the image to be recognized through the target image recognition model to obtain the text information corresponding to the image to be recognized; or
   in response to that the current convergence performance is lower than the preset convergence performance threshold, adjusting the parameter for the initial image recognition model.

5. The method for image recognition via wireless federated learning of claim 1,
   wherein the recognizing the image to be recognized through the target image recognition model to obtain the text information corresponding to the image to be recognized comprises:
   performing feature extraction on the image to be recognized through a preset distributed principal component decomposition algorithm to obtain a feature of the image to be recognized; and
   recognizing the feature of the image to be recognized through the target image recognition model to obtain the text information corresponding to the image to be recognized.

6. A device for image recognition via wireless federated learning, comprising a memory, a processor, and a program for image recognition via wireless federated learning stored on the memory and executable on the processor, wherein when the processor executes the program for image recognition via wireless federated learning, the method for image recognition via wireless federated learning of claim 1 is implemented.

7. A non-transitory computer-readable storage medium, wherein a program for image recognition via wireless federated learning is stored on the non-transitory computer-readable storage medium, and when the processor executes the program for image recognition via wireless federated learning, the method for image recognition via wireless federated learning of claim 1 is implemented.

* * * * *